US007526317B2

(12) United States Patent
Pinder et al.

(10) Patent No.: US 7,526,317 B2
(45) Date of Patent: Apr. 28, 2009

(54) INTERFACE SYSTEM FOR AN ACCESSORY AND COMMUNICATION DEVICE

(75) Inventors: Ellis A. Pinder, Davie, FL (US); Robert J. Higgins, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 221 days.

(21) Appl. No.: 11/539,453

(22) Filed: Oct. 6, 2006

(65) Prior Publication Data

US 2007/0127397 A1    Jun. 7, 2007

Related U.S. Application Data

(62) Division of application No. 10/669,032, filed on Sep. 23, 2003.

(51) Int. Cl.
    *H04B 1/38*    (2006.01)
(52) U.S. Cl. .................. 455/557; 455/558; 455/559; 455/418; 455/420; 455/68; 455/90.2; 455/556.1; 710/8; 710/9; 710/10; 710/15; 710/72; 710/73; 710/104
(58) Field of Classification Search .......... 450/556.1–2, 450/557–559, 90.1–2, 418–420, 68–69; 710/1–19, 710/72–74, 62–63, 104, 305, 308, 309, 313–315; 713/1, 2, 100, 190
See application file for complete search history.

(56) References Cited

U.S. PATENT DOCUMENTS

| 5,257,413 | A  | * | 10/1993 | Warner et al. ............... 455/557 |
| 6,112,103 | A  | * | 8/2000  | Puthuff ...................... 455/557 |
| 6,285,890 | B1 | * | 9/2001  | Panian ........................ 455/557 |
| 6,418,486 | B1 | * | 7/2002  | Lortz et al. ................... 710/10 |
| 6,484,219 | B1 | * | 11/2002 | Dunn et al. ................... 710/42 |
| 6,687,814 | B1 | * | 2/2004  | Duppong ....................... 713/1 |
| 6,718,182 | B1 | * | 4/2004  | Kung ...................... 455/556.1 |
| 6,725,061 | B1 | * | 4/2004  | Hutchison et al. ........... 455/557 |
| 6,961,790 | B2 | * | 11/2005 | Swope et al. ................ 710/104 |
| 2001/0032318 | A1 | * | 10/2001 | Yip et al. .................... 713/190 |
| 2004/0152457 | A1 | * | 8/2004  | Goldstein et al. ........... 455/419 |
| 2005/0014531 | A1 | * | 1/2005  | Findikli ..................... 455/557 |

\* cited by examiner

*Primary Examiner*—Tuan A Tran
(74) *Attorney, Agent, or Firm*—Barbara R. Doutre

(57) ABSTRACT

A configurable interface system (100) couples an accessory (102) to a communication device (104). The interface system utilizes a memory device (120) embedded in the accessory (102) that stores physical configuration and event mapping descriptors (114, 122) pertaining to the accessory. The communication device (104) reads the physical configuration and event mapping descriptors and configures its external interface (112) in response thereto, preferably through the use of bi-directional GPIO lines (110).

17 Claims, 3 Drawing Sheets

_US 7,526,317 B2_

INTERFACE SYSTEM FOR AN ACCESSORY AND COMMUNICATION DEVICE

CROSS REFERENCE TO RELATED APPLICATIONS

This application is a divisional of U.S. application Ser. No. 10/669,032, filed Sep. 23, 2003, assigned to Motorola, Inc.

This application is related to pending U.S. application Ser. No. 10/669,033 Higgins, et al. entitled "Audio Accessory Optimization System" and U.S application Ser. No. 10/669,034 by Ellis A. Pender, entitled "Method and Apparatus To Self-Configure An Accessory Device," both filed concurrently herewith, and assigned to Motorola, Inc.

TECHNICAL FIELD

This invention relates in general to accessories for communication devices, and more particularly to the interface between the accessory and the communication device.

BACKGROUND

As portable electronic devices become smaller, there is a corresponding decrease in the area for external device connectors commonly used for accessories. There are also practical limits to external connector density and size, because such connectors are intended to be as durable and reliable as possible. Not only is the goal of a smaller connector in conflict with durability and reliability goals, but it also imposes limits on the number of connector pins. Fewer connector pins limits functionality and/or reduces flexibility.

Today's two-way radios connect to an array of accessories that are of varying complexity. Some of these accessories contain a microprocessor and are considered "smart", while others are less complex (hereafter, "simple accessories") and intended to be low cost. Smart accessories typically communicate with the radio through a data bus, while simple accessories tend to use a number of discrete digital lines and have no microcontroller. Smart accessories may also require discrete digital lines in addition to the data bus for special functions. Accessories may often have additional lines for audio, which further increases pin count. Although sophisticated digital interfaces are available that can handle audio, data, and control signals, the cost and complexity of such an interface is often prohibitive. A desired accessory interface must be flexible enough to meet the needs of both smart and simple accessories without requiring excessive pin count, excessive cost, or excessive complexity.

Additionally, it is important to have a common accessory interface for all radio accessories, including accessories not yet developed. It is strongly desired to minimize changes to the radio to support such accessories. Although some radios are intended to be flash-upgradeable, many lower-cost radios are not upgradeable. It is important that lower-cost radios be able to utilize as many future accessories as possible. It is also desirable for the least complicated or most simple accessories to work on the widest possible range of radios.

Accordingly, there is a need for a common accessory interface that meets the needs of both smart accessories and simple accessories, while providing maximum flexibility for configuring the interface. There is also a need to keep the pin count of the accessory interface as small as possible to minimize cost and complexity.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
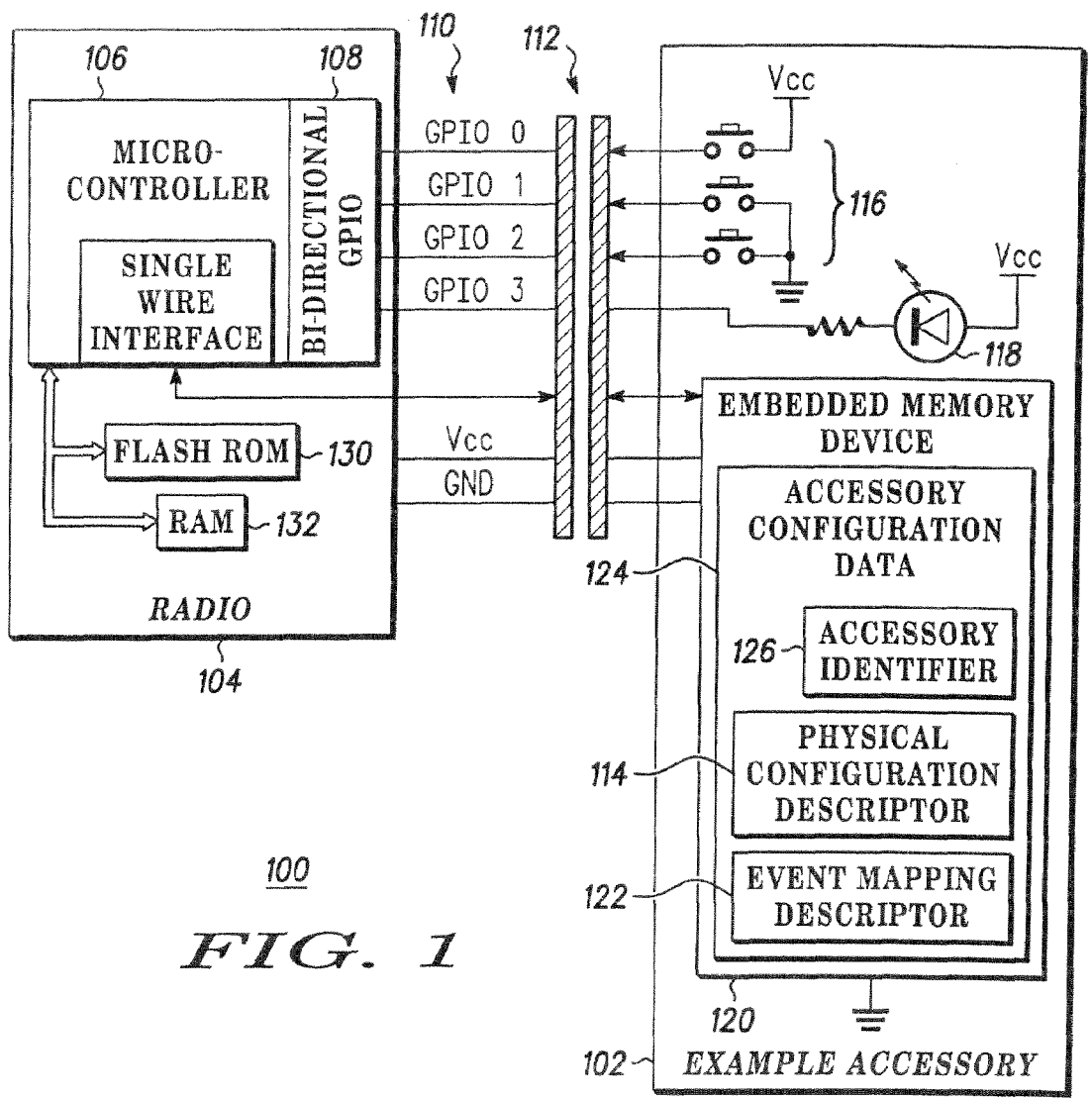
FIG. 1 is an interface between an accessory and a portable communication device in accordance with the present invention.

While the specification concludes with claims defining the features of the invention that are regarded as novel, it is believed that the invention will be better understood from a consideration of the following description in conjunction with the drawing figures, in which like reference numerals are carried forward.

In accordance with the present invention, there is provided herein a communication device having a configurable external interface; an accessory having a memory with both physical configuration and event mapping descriptors pertaining to the accessory; and radio software capable of reading the descriptors, configuring the external interface, and processing events related to the configurable interface.

The interface system of the present invention provides a highly flexible means to interface accessories of varying complexity to a communication device, preferably a portable communication device such as a two-way radio, or a mobile radio. Simple accessories can now be afforded capabilities not previously available or previously available only to smart accessories. The present invention provides such increased capability with very minimal increase in cost. Accessories can now be deployed with enhanced or altered capabilities with no change to the radio software or hardware.

FIG. 1 is a block diagram of an interface system 100 between an accessory 102 and a portable communication device 104 in accordance with a preferred embodiment of the invention. In the preferred embodiment, the communication device 104 is a radio that contains a microcontroller 106 with a configurable general purpose input output (GPIO) interface 108. GPIO pins 110 with bi-directional capability—software programmable to function as either an input or an output—are connected to the external radio interface 112. Upon power-up of radio 104 the GPIO pins 110 are configured to a default, inert configuration where all pins are configured as inputs. The default configuration is typically the result of the power-up state of microcontroller 106. The radio 104 periodically checks the external radio interface 112 to detect the presence of an accessory 102. Upon accessory detection, the radio 104 reads the contents of embedded memory device 120. Embedded memory device 120 can be any type of memory device, but those skilled in the art would likely select a memory device with a serial interface to minimize the pin count of external radio interface 112. Many different types of serial memory devices are available, such as a single wire 1-Wire™ device from Dallas Semiconductor, a two wire I²C™ device available from Phillips Electronics, or a three wire Serial Peripheral Interface (SPI) memory device to name but a few. The serial interface provides bi-directional data and optionally clock signals to and from the serial memory device. In the preferred embodiment of the invention, the embedded memory device 120 is a single wire memory device, such as the 1-Wire™ serial EEPROM.

The embedded memory device contains accessory configuration data 124 which provides information to the radio 104 on how to configure external accessory interface 112 and how to operate accessory 102. Accessory configuration data 124 contains exactly one accessory identifier 126, at least one physical configuration descriptor 114 and at least one event mapping descriptor 122. The accessory identifier 126 is used to uniquely identify the type or model of accessory 102.

To operate accessory 102, radio 104 must configure external radio interface 112 and radio 104 must configure its software associated with interface 112 to monitor and drive the appropriate signals in accordance with the needs of the accessory. Before explaining the internal software configuration of radio 104 and its operation of interface 112, it is first necessary to explain how the configuration of interface 112 and the aforementioned internal configuration of radio 104 is specified. This is accomplished by the physical descriptor(s) 114 and event mapping descriptor(s) 122.

The radio will then read all the physical configuration descriptors 114. In the preferred embodiment, all port configuration information is contained in a single physical configuration descriptor (PCD). The physical configuration descriptor contains the following information about each of the five GPIO lines:

Data direction: input or output;

Logic sense: active high or active low;

Priority (inputs only) high/low (high priority is typically assigned to interrupt).

The radio 104 then configures the external radio interface 112 to correspond to the physical configuration descriptor. In the preferred embodiment, radio 104 supports a standard set of five GPIOs labeled GPIO0 to GPIO3 with GPIO4 not depicted in FIG. 1. In an alternate embodiment, a radio may support a smaller or larger set of GPIOs. Connection of an accessory that requires an extended set of GPIOs to a radio that only physically provides the standard five GPIOs would result in an error condition. The radio 104 will detect the error condition by seeing a physical configuration descriptor 114 that specifies more physical GPIO lines than are physically present on the radio. The radio 104 indicates this error condition to the user and blocks the operation of the accessory 102. Alternately, radio 102 may allow operation of the accessory with reduced functionality if the radio determines that such operation is possible. For example, suppose a low-cost radio supports 3 GPIOs, and a high-tier radio support five GPIOs. A remote speaker microphone (RSM) requires two GPIOs, but a "deluxe" RSM requires four GPIOs to support an extra Emergency button and "man down" sensor. The standard RSM will work properly on both radios, because both radios can provide the required number of GPIOs. The deluxe RSM will work properly on the high tier radio, but the low tier radio has an insufficient number of lines. The radio manufacturer may choose to allow limited operation of the microphone with one of the functions unconfigured, perhaps man-down. Alternately, the radio manufacturer may choose to disallow operation of this microphone entirely for fear the user expects these safety features to work when connected to the radio.

FIG. 1 depicts an example of a simple accessory consisting of three switches 116 and one LED 118. In this example, the fifth GPIO, GPIO4, is unused and not shown. The physical configuration descriptor 114 is contained in embedded memory device 120. Upon examination of FIG. 1, the following port descriptors would be expected for this accessory:

GPIO 0—input, active high;

GPIO 1—input, active low;

GPIO 2—input, active low

GPIO 3—output, active low

GPIO 4—not shown and not used in this example

While priority information has not been inferred for this example, any of the GPIO inputs can be specified as having high priority. For example, if GPIO 1 is a push-to-talk (PTT) switch commonly found on two-way radios, the GPIO 1 would likely be defined to be high priority.

After reading the physical configuration descriptor 114, the radio parses the descriptor for pin configuration information. The radio will then configure the bi-directional GPIO interface 108 of microcontroller 106 to correspond to the input or output direction specified for each pin. For each pin that is an output, the radio configures the output level to "inactive." For example, GPIO3 in FIG. 1 is an active low output because GPIO3 must be logic low for the LED to light. GPIO3 would thus be initialized to a logic 1 or "high" because this is the inactive state. For each pin that is an input, the radio 104 will configure software to monitor all inputs based on their logic type, and generate an activate or deactivate event on a transition. The event type, activate/deactivate, will be determined by the transition and the logic type, active high or active low, assigned to each pin in the physical configuration descriptor. The priority level of each pin will cause an interrupt configuration for high priority pins, if such capability is available. If accessory configuration data 124 contains more than one physical configuration descriptor, then they are iteratively loaded and parsed.

The flexibility of the interface system 100 becomes truly apparent when another accessory is created using all five GPIOs of the preferred embodiment. For example, a new accessory that utilizes two LEDs and three buttons would utilize all five of the GPIOs. For this new accessory, suppose all three of the inputs are active low, and suppose one LED was active high and one LED was active low. Utilizing the present invention, no software or hardware changes are required in the radio to accommodate this new accessory, because configuration is automatic based on the information in the physical configuration descriptor of the new accessory. The selectable logic sense of the interface system 100 is especially important because existing accessories or third party accessories can easily be retrofitted eliminating re-design. Furthermore, some inputs may be sensors instead of buttons and may have a pre-determined logic sense.

The radio will also read at least one event mapping descriptor 122 which provides the link between physical interface lines and actual radio functionality. For input events to the radio, the event mapping descriptor determines what happens when a particular input line is activated or deactivated. For output events from the radio, the event mapping descriptor controls the output lines based on internal radio events or states. In the preferred embodiment, a single mapping descriptor contains the information for all radio events pertaining to the accessory interface.

Figure 2:
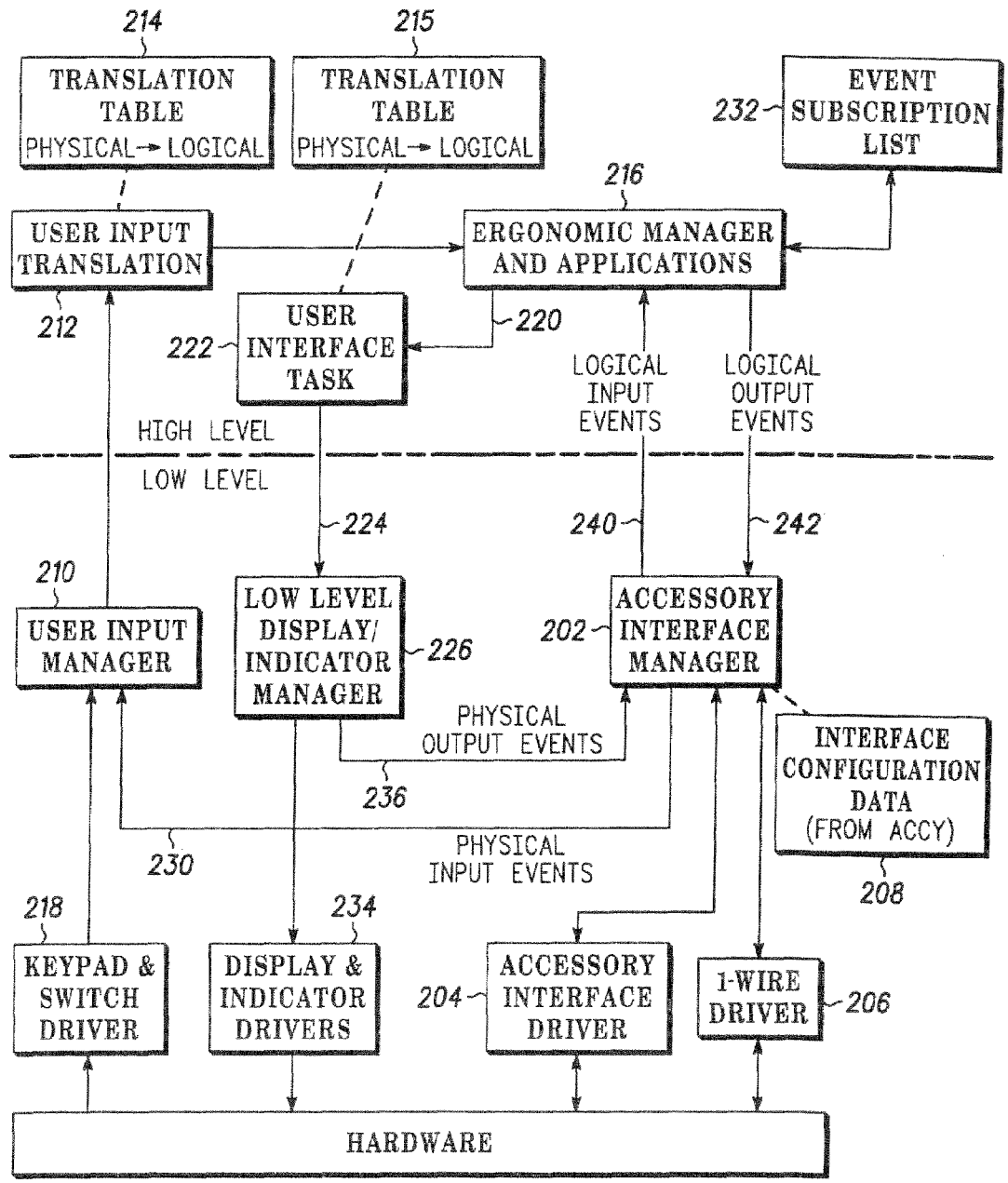
FIG. 2 is a block diagram of radio software architecture formed in accordance with a preferred embodiment of the invention.

FIG. 2 is a block diagram of radio software architecture 200 operating in accordance with a preferred embodiment of the invention. Radio firmware that utilizes architecture 200 physically resides in FLASH ROM 130 and also utilizes RAM 132. An accessory interface manager 202 is used to provide logical control over the interface. The accessory interface manager 202 is responsible for reading the embedded memory device containing the accessory configuration data. As stated above, the embedded memory device in the preferred embodiment is a single wire device, so accessory interface manager 202 uses driver 206 to access the embedded memory. The accessory interface manager 202 is also responsible for reading the physical configuration descriptors and event mapping descriptors from the single wire device. This information is read and stored locally in the radio for easy access, and is shown collectively here as interface configuration data 208.

The accessory interface manager 202 parses the event mapping descriptor which contains at least one entry. In the preferred embodiment, there are five such entries, at least one event for each GPIO. A one-to-one relationship between a GPIO entry in the physical configuration descriptor and the event mapping descriptor is not required. There may be more or less entries for event mapping. For inputs, multiple conditions may be required to trigger an event (an AND condition of multiple GPIOs) or different conditions could trigger the same event (OR condition). For outputs, multiple events can also be associated with an output in a similar manner. Multiple events may also share a GPIO. For example, three GPIOs may each have a corresponding event. A fourth event may be defined based on the logical state of all three GPIOs. The information contained for each event is specified by:

Event identifier—specifies event code in the radio
Control type—logical event or physical event
GPIO number—the GPIO related to this event
Logical event coupling—AND, OR, or NONE
Output control "toggle" or momentary duration The event identifier specifies an event code in the radio which can be a user input or an output (indication) event. The radio software recognizes the event identifier internally. Additionally, event codes can be further subdivided into logical and physical events, yielding a total of four event types:

physical input event
logical input event
physical output event
logical output event Logical events differ from physical events in that they convey some higher-level logical state information about the radio. Each of the physical input event, logical input event, physical output event, logical out event are described in more detail below.

A physical user input event specifies an activation of a physical button on the radio. The physical input event is detected by accessory interface manager 202 using accessory interface driver 204. Typically, buttons do not have pre-defined meanings. Physical buttons have button identifiers which are processed by a user input manager 210. Based on interface configuration data 208, accessory interface manager 202 knows the event type (logical or physical) of a given input event. For physical input events, accessory interface manager 202 forwards the input event to user input manager 210. The user input manager 210 sends detected physical events to a user input translation task 212 which uses a translation table 214 to map the physical event to a logical event. The logical event is then forwarded to an ergonomic manager and applications processing block 216 for processing.

A physical input event assigned to a single GPIO pin configured as an input is therefore an external means to activate a physical radio button. The high level applications are unaware the "press" came over the accessory connector, because the accessory interface manager 202 sends physical user input events directly to the user input manager 210. Normal button presses on the radio itself are detected by keypad and switch driver 218 and are also sent to user input manager 210.

Figure 3:
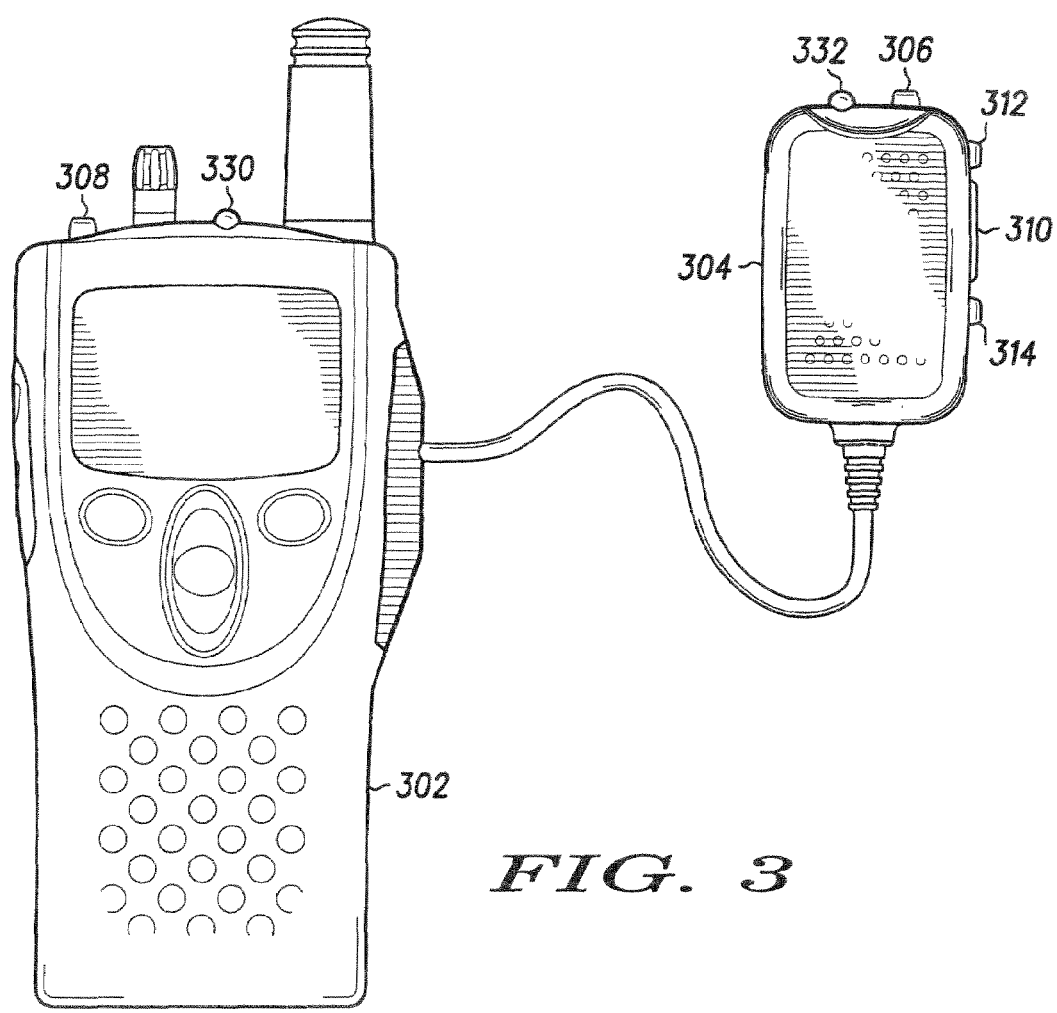
FIG. 3 is a radio and an external microphone accessory formed in accordance with the present invention.

If the translation table 214 were to change, then the corresponding action of the actual radio button and the external physical input would also change. This coupling may be very desirable in some cases. For example, referring to FIG. 3 there is shown a radio 302 and an external microphone accessory 304 formed in accordance with the present invention. The external microphone accessory 304 includes a top button 306, preferably an orange top button, similar to the radio's top button 308 which may be programmed for an emergency feature. The functionality of these two buttons 306, 308 should always be the same. By making the accessory interface GPIO connected with button 308 associated with a physical input event, this coupling is guaranteed. Should the user re-program this top button 306 for "phone", the functionality of both buttons 306, 308 would change. The coupling in this example is desirable because both buttons are the same color (such as orange) and on the top of the units, and a user would expect them to behave identically. A "button mapping table" is usually stored in the radio codeplug and provides considerable flexibility to the user in configuring a radio.

A physical output event works in a similar matter to a physical input event but in the reverse direction. A logical event 220, created by the ergonomic manager and applications processing block 216, is sent to the user interface task 222 which then translates this logical indicator into a physical indicator event 224 using translation table 215. This translation table 215 maps logical events to physical hardware, since different types of radios have different types of LCD displays and different type and colors of LEDs. After mapping, physical indicators 224 are sent to a low level display/indicator manager 226, which operates the actual radio physical indicators through drivers 234. Low level display/indicator driver 226 also sends physical indicator event information to accessory interface manager 202. Based on interface configuration data 208, accessory interface manager 202 knows the event type (logical or physical) of a given output event. For physical output events, accessory interface manager 202 operates the associated GPIO line in accordance with the output event using accessory interface driver 204.

An accessory interface port configured as an output and having a physical output event associated with it would function exactly like a physical indicator on the radio. An example would a microphone accessory with a red LED indicator. Using a physical output event causes the red LED to work just like the radio's red LED. The red LED indicates a transmit condition, and depending on the radio, it might also indicate low battery and busy channel conditions. A physical output event might also be used to add a new indicator not physically present on the radio. For example, an external microphone with a tactile transducer (vibrator) can be connected to the radio. The radio may already know about this type of indicator and how to process it, but this indicator may not be physically realized on the radio. By adding the vibrating microphone, the new indicator automatically works because the accessory interface manager 202 will route this physical indicator to the vibrator's signal line.

For physical events the accessory interface manager 202 reads both the physical configuration descriptors and the event mapping descriptors (from interface configuration data 208) and then determines the logic necessary to manage these events. For input events, including both the detection and "undetection" of the event, the accessory interface manager 202 sends the physical event 230 to the user input manager 210. For output events, the accessory interface manager 202 monitors physical output events 236 from the low level display/indicator manager 226 and activates/deactivates the appropriate lines to display and indicator drivers 234.

The logical events coupling field for each event in the event mapping descriptor specifies whether this event is coupled to other events. Logical event coupling can apply to physical and logical events. This mechanism allows multiple lines to trigger one physical input event or one physical output event to trigger multiple lines. As an example, consider the external microphone 304 of FIG. 3 that has a PTT switch 310, hang up box (HUB)/monitor 312, a phone button 314, and the orange button 306. Three entries are made in the physical configuration descriptor, one for each of the three GPIO lines (GPIO 0, GPIO 1, GPIO 2) connected to the first three of these buttons. The fourth button, the orange button, 306 is connected to GPIO 0 and GPIO 2 (PTT and phone). Three entries are also made in the event mapping descriptor, one for each of the first three buttons.

Event identifier—2101 (physical—PTT)
    Event type—input event
    Control type—physical event
    GPIO number—GPIO 0
    Logical coupling—none
    Output control—not applicable (this field for output events only).
    Event identifier—2107 (physical—monitor/hub)
    Event type—input event
    Control type—physical event
    GPIO number—GPIO 1
    Logical coupling—none
    Output control—not applicable (this field for output events only).
    Event identifier—2140 (physical—phone)
    Event type—input event
    Control type—physical event
    GPIO number—GPIO 2
    Logical coupling—none
    Output control—not applicable (this field for output events only).

Two additional entries are added for the fourth button. The entries are shown below:

Event identifier—2133 (physical—orange button)
    Event type—input event
    Control type—physical event
    GPIO number—GPIO 0
    Logical coupling—AND
    Output control—not applicable (this field for output events only).
    Event identifier—2133 (physical—orange button)
    Event type—input event
    Control type—physical event
    GPIO number—GPIO 2
    Logical coupling—AND
    Output control—not applicable (this field for output events only).

The descriptor information above shows that a "physical orange button" event will occur when both the GPIO 0 and GPIO 2 are active. The accessory interface manager 202 is responsible for detecting and understanding these logical relationships and handing the event processing associated with them.

The processing for logical input or output events is similar to the processing for physical ones. The same relational operator can also apply to logical events. Again, logical events differ from physical events in that they convey some state information about the radio. This state information may or may not be physically conveyed otherwise. For example, a logical input event "enter emergency" would cause the radio to activate the emergency feature and enter the emergency state. In a previous example on physical input event, an orange button on an external microphone was specified which aligns with the orange button commonly found on portable radios. In this previous example, the functionality of the two buttons was always the same because it was a physical input event. The two physical inputs—one on the radio and one on the microphone—would be combined for later translation. In the logical input event example, a button could be specified to have a logical event called emergency associated with it. Because this is a logical input event, this button will always be emergency regardless of the radio connected to the microphone and regardless of any button mapping in the radio codeplug (assuming the connected radio contains the emergency feature).

For a logical output event case, referring again to FIG. 3, a microphone 304 with a green LED 332 may be associated with a "call alert received" logical event. When the radio receives a call alert this event is activated. On most portable radios, a call alert is indicated by a blinking green LED 330. If a physical output event was used in this example instead of a logical one, the green LED 332 would similarly be activated when a call alert was received. But because of a physical mapping, the microphone green LED 332 would also be activated on phone received, private call received, and others. If a green LED is desired for a call alert received and phone call received only, then two logical events can be set up in the event mapping descriptor using an OR relationship. Both entries can map to the same GPIO, which is connected to the green LED 332.

For logical events the accessory interface manager 202 reads both the physical configuration descriptor and the event mapping descriptors and then determines the logic necessary for these events. For input events, including both the detection and "undetection" of the event, the accessory interface manager 202 sends the logical event 240 directly to the high level ergonomic manger and application processing block 216. For output events, the accessory interface manager monitors logical output events 242 from the high level and takes appropriate action. Because of the complexity of today's tow-way radios and the potentially large number of logical events, a registration service is used in the preferred embodiment. Upon detection of an accessory, the accessory interface manager knows which logical events, if any, must be monitored. The manager then registers the desired events with the ergonomic manager and application processing block 216 for the events of interest. In this manner, only relevant events are received by the accessory interface manager. Registered events are stored in event subscription list 232 of FIG. 2.

For logical output events, an additional field for each event in the event mapping descriptor specifies "output control." If this field is set to "toggle," then the signal will reflect whether a radio is in a particular state. A transition will occur when the event happens, and an opposite transition will occur when the event is reset (the radio has exited the state that caused the event). If the field is set to momentary duration, then a pulse will be output upon detection of the event. The pulse duration is configurable in the descriptor. An example of the toggle control would be a qualified channel activity receive indication. The output signal would be "active" for the duration of the qualified channel activity. An example of the toggle momentary duration would be an emergency indicator intended to trigger another device. The emergency indicator can be configured for a 500 ms pulse, for example. The terms "active" and "inactive" are used to describe the state of the signals because the physical configuration descriptor allows active high or active low logic on a per-GPIO basis.

As demonstrated by the preceding examples, the interface system of the present invention provides significant flexibility in signal routing and coupling to high-level and low-level radio events. In accordance with the present invention, the addition of accessory interface manager 202, accessory interface driver 204, interface configuration data 208, event subscription list 232 and input/output event paths 230, 236, 240, 242 provide expanded accessory interfacing and configuration capability. A number of other extensions and modifications can further enhance the interface system of the present invention. For example, the physical configuration descriptors or event mapping descriptors can be encrypted or digitally signed to restrict operation of the interface to approved accessories. When the accessory interface manager reads these descriptors it decrypts or authenticates them. Improperly signed descriptors will prevent interface configuration, rending the accessory inoperable. While described primarily in terms of digital signals, the interface system can be extended to include analog inputs and trigger thresholds. Periodic polling can be used to support various sensors if desired. While the preferred embodiment has described the logical coupling in terms of AND conditions or OR conditions to be used to link entries in the event mapping descriptor, more complex logic could be used along with other implantations to implement the logical coupling.

Accordingly, there has been provided an interface system that provides a configurable interface by storing physical signal configuration information in a memory device in an accessory. The information is coupled to event processing information that is also specified in the memory device. New accessories can now be deployed with no changes to the physical interface or the radio software. While the description has referred to a portable radio, the interface system of the present invention applies equally to a mobile radio. The interface system formed in accordance with the present invention provides a highly flexible means to interface accessories of varying complexity to portable communication devices. Future accessories can now be afforded capabilities not previously available or previously available only to "smart" accessories. These accessories can now be deployed with enhanced or altered capabilities with no change to the radio software or hardware keeping the devices small and pin counts low.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A radio architecture for interfacing with an accessory, the radio architecture including:

an accessory interface manager for receiving event mapping descriptors and physical configuration descriptors from the accessory;

an accessory interface driver coupled to the accessory interface manager.

2. The radio architecture of claim 1, wherein the physical configuration descriptors contain data direction and logic sense.

3. The radio architecture of claim 1, wherein the event mapping descriptors contain event identifier, control type, and GPIO number.

4. The radio architecture as described in claim 3, wherein the event identifier specifies an event code in the radio which is an indication event.

5. The radio architecture as described in claim 4, wherein the event identifier specifies an event code in the radio which is a user input event.

6. The interface system as described in claim 5, wherein the indication events and user input events are subdivided into logical and physical events yielding: physical input event, logical input event, physical output event, and logical output event.

7. The radio architecture of claim 6, wherein the physical input event is assigned to a single GPIO pin configured as an input thereby providing an external means to activate a physical radio button.

8. The radio architecture of claim 6, wherein the physical output event is created when a logical event, created by an ergonomic manager and application field, is sent to a user interface task which then translates a logical indicator into a physical indicator using a translation table.

9. The radio architecture as described in claim 1, wherein at least two logical events are set up in the event mapping descriptor using an OR relationship.

10. The radio architecture as described in claim 1, wherein at least two logical events are set up in the event mapping descriptor using an AND relationship.

11. The radio architecture as described in claim 1, wherein at least two physical events are set up in the event mapping descriptor using an OR relationship.

12. The radio architecture as described in claim 1, wherein at least two physical events are set up in the event mapping descriptor using an AND relationship.

13. The radio architecture system of claim 1, wherein the physical configuration descriptors are encrypted.

14. The radio architecture system of claim 1, wherein the physical configuration descriptors are digitally signed.

15. The radio architecture system of claim 1, wherein the event mapping descriptors are encrypted.

16. The radio architecture system of claim 1, wherein the event mapping descriptors are digitally signed.

17. The radio architecture of claim 1, wherein for physical events, the accessory interface manager sends physical event mapping descriptors to a user input manager, and for output events, the accessory interface manager monitors outputs from a low level display/indicator manager and activates/deactivates display and indicator drivers.

\* \* \* \* \*